United States Patent
Xiang et al.

(10) Patent No.: US 10,183,402 B1
(45) Date of Patent: Jan. 22, 2019

(54) PACKING FOAM POSITIONING DEVICE

(71) Applicants: HON HAI PRECISION INDUSTRY CO., LTD., New Taipei (TW); Fu Tai Hua Industry (Shenzhen) Co., Ltd., Shenzhen (CN)

(72) Inventors: Jian-Hua Xiang, Shenzhen (CN); Ze-Feng Xu, Shenzhen (CN); Li-Chin Lu, New Taipei (TW)

(73) Assignees: HON HAI PRECISION INDUSTRY CO., LTD., New Taipei (TW); Fu Tai Hua Industry (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/870,867

(22) Filed: Jan. 13, 2018

(30) Foreign Application Priority Data

Aug. 30, 2017 (CN) .......................... 2017 1 0764602

(51) Int. Cl.
*B25J 15/06* (2006.01)
*B65B 35/18* (2006.01)
*B65G 47/91* (2006.01)

(52) U.S. Cl.
CPC ........... *B25J 15/0616* (2013.01); *B65B 35/18* (2013.01); *B65G 47/91* (2013.01)

(58) Field of Classification Search
CPC .... H01L 21/6838; B66C 1/02; B25J 15/0616; B65B 35/18; B65G 47/91

USPC .......................................................... 294/183
See application file for complete search history.

(56) References Cited

U.S. PATENT DOCUMENTS

| 6,445,201 | B1* | 9/2002 | Simizu | G01R 1/0483 |
| | | | | 324/750.02 |
| 8,960,750 | B2* | 2/2015 | Gong | B25J 15/0057 |
| | | | | 294/188 |
| 2012/0049397 | A1* | 3/2012 | Imai | B21D 22/00 |
| | | | | 264/101 |
| 2013/0129464 | A1* | 5/2013 | Regan | B25J 15/0625 |
| | | | | 414/800 |

* cited by examiner

*Primary Examiner* — Stephen A Vu
(74) *Attorney, Agent, or Firm* — ScienBiziP, P.C.

(57) ABSTRACT

A packing foam positioning jig for assembling a piece of packing foam to a workpiece includes a suction tube. The suction tube includes a rod body and a positioning seat. The rod body is coupled to the positioning seat. The rod body defines a suction channel. The positioning seat defines at least one suction hole. The at least one suction hole communicates with the suction channel. The positioning seat includes at least one positioning post protruded from an outer surface of the positioning seat. The piece of packing foam is sleeved on the at least one positioning post. The at least one suction hole suctions the piece of packing foam. The at least one positioning post and the at least one suction hole cooperate to assemble the piece of packing foam to the workpiece.

9 Claims, 4 Drawing Sheets

PACKING FOAM POSITIONING DEVICE

CROSS-REFERENCE TO RELATED APPLICATIONS

This application claims priority to Chinese Patent Application No. 201710764602.8 filed on Aug. 30, 2017, the contents of which are incorporated by reference herein.

FIELD

The subject matter herein generally relates to a packing foam positioning jig, and more particularly to a packing foam positioning jig for accurately positioning a piece of packing foam to a surface of a workpiece.

BACKGROUND

Generally, packing foam is required when packing electronic devices or other delicate products. Usually, the packing foam is assembled to the product by hand, and accurate positioning of the packing foam to rounded surfaces of the product may be troublesome.

BRIEF DESCRIPTION OF THE DRAWINGS

Implementations of the present disclosure will now be described, by way of example only, with reference to the attached figures.

DETAILED DESCRIPTION

Figure 1:
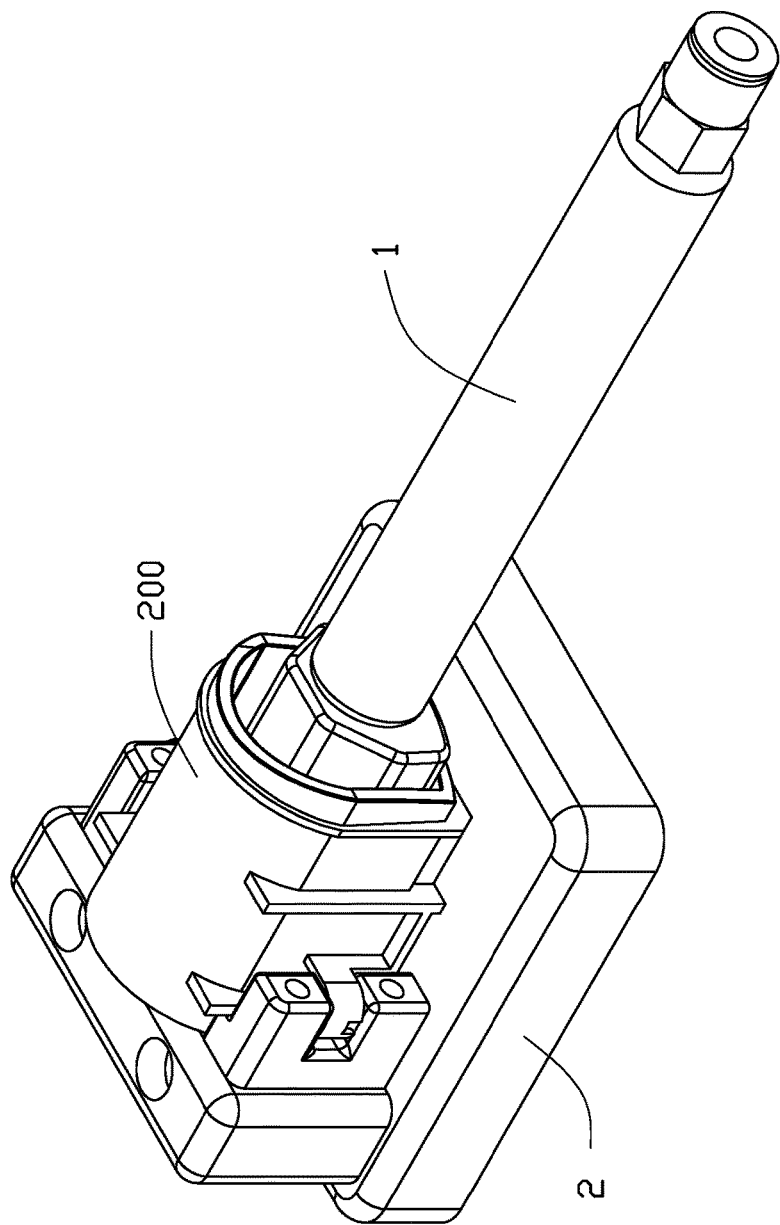
FIG. 1 is an assembled, isometric view of an exemplary embodiment of a packing foam positioning jig in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected.

FIG. 1 illustrates an embodiment of a packing foam positioning jig 100. The packing foam positioning jig 100 includes a suction tube 1 and a fixing seat 2. The fixing seat 2 is separated from the suction tube 1. The fixing seat 2 is used for fixing a workpiece 200 in place. The suction tube 1 is used for suctioning a piece of packing foam 300 (shown in FIG. 2) and assembling the piece of packing foam 300 to an adhering surface 210 of the workpiece 200.

Figure 2:
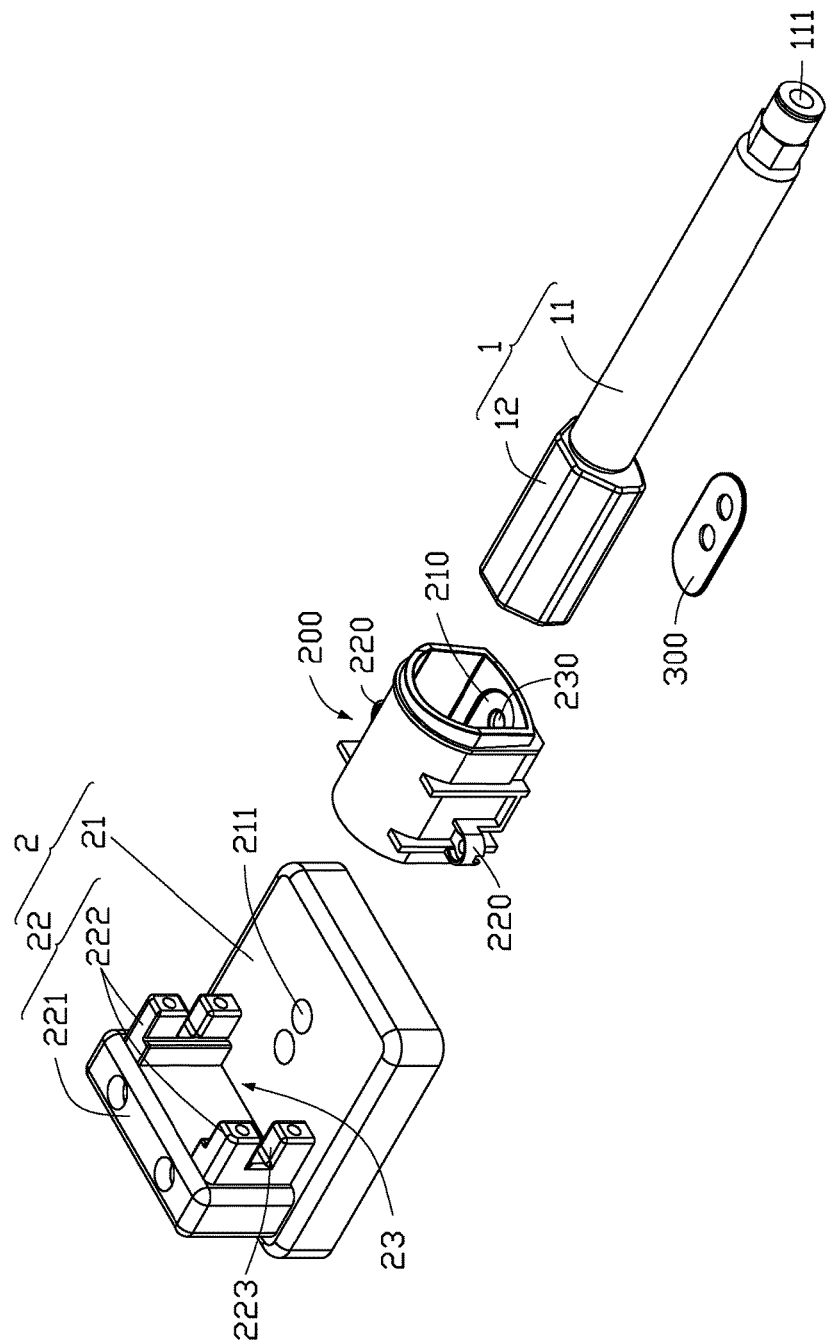
FIG. 2 is an exploded, isometric view of the packing foam positioning jig in FIG. 1.
Figure 3:
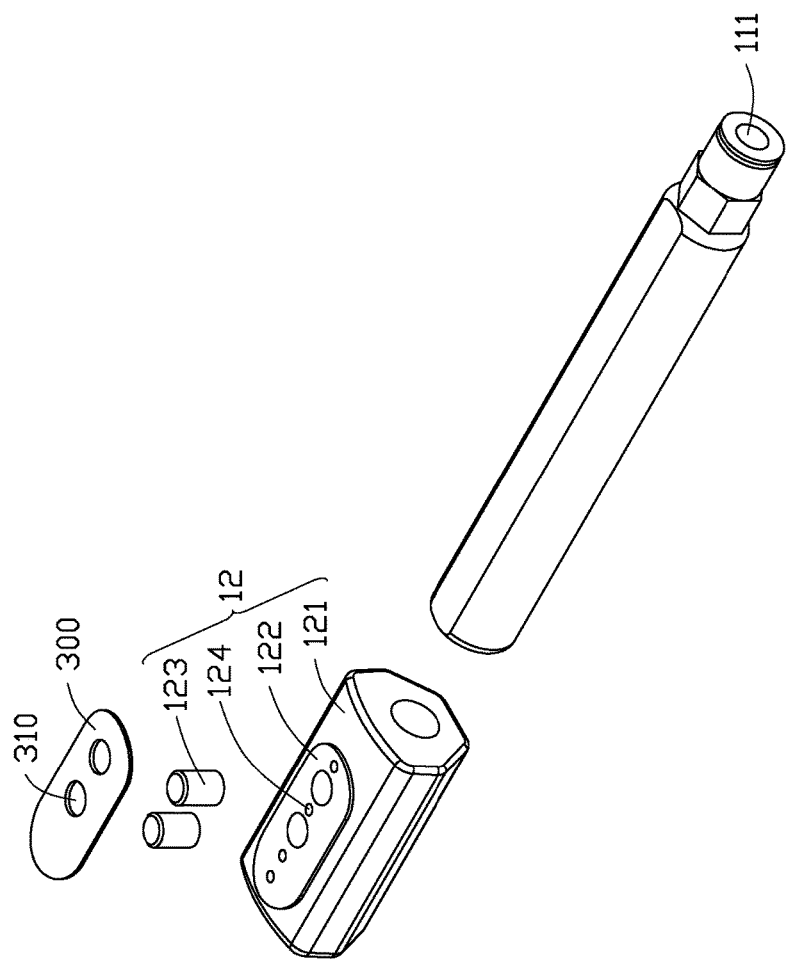
FIG. 3 is an isometric exploded view of a suction tube in FIG. 2, but shown from another angle.

Referring to FIG. 2, the suction tube 1 includes a rod body 11 and a positioning seat 12. The rod body 11 and the positioning seat 12 are coupled together. In at least one embodiment, the rod body 11 and the positioning seat 12 are integrally formed. In another embodiment, the rod body 11 and the positioning seat 12 are separately coupled together. Referring to FIG. 3, the positioning seat 12 includes a matching surface 122 protruded from an outer surface 121 of the positioning seat 12. The matching surface 122 corresponds to the piece of packing foam 300. A size and a shape of the matching surface 122 matches a size and a shape of the piece of packing foam.

Figure 4:
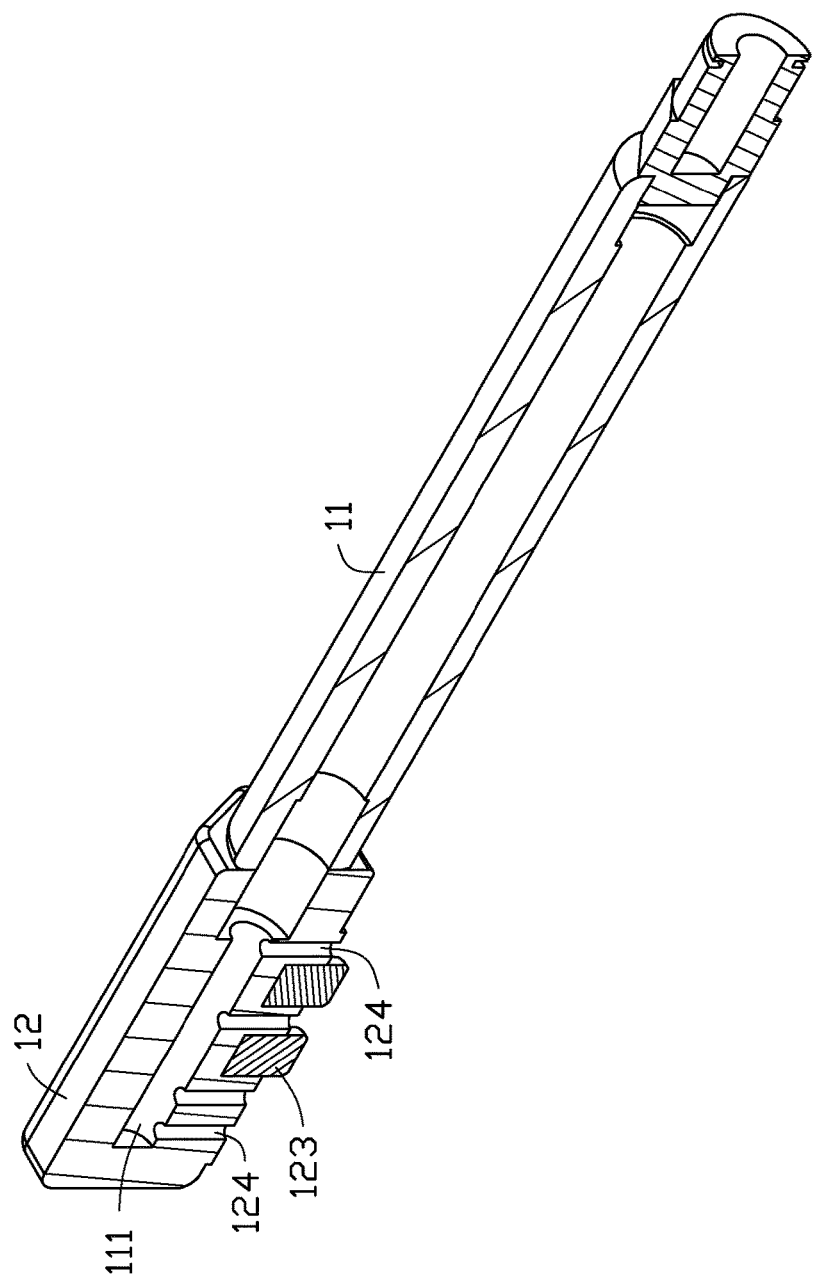
FIG. 4 is a partial cutaway view of the suction tube in FIG. 2.

In at least one embodiment, the positioning seat 12 further includes at least one positioning post 123 and defines at least one suction hole 124. The positioning post 123 is arranged on the matching surface 122. The piece of packing foam 300 is sleeved on the positioning post 123. In at least one embodiment, the piece of packing foam 300 defines at least one first through hole 310. When the packing foam positioning jig 100 is used to assemble to piece of packing foam 300, the positioning post 123 of the suction tube 1 is passed through the first through hole 310 of the piece of packing foam 300. The rod body 11 defines a suction channel 111. The suction hole 124 is defined through the matching surface 122 and aligns with the suction channel 111 (shown in FIG. 4). The suction hole 124 is used to suction the piece of packing foam 300. When the piece of packing foam 300 is sleeved on the positioning post 123, a suction force through the air channel 111 and the suction hole 124 creates a negative pressure and adheres the piece of packing foam 300 to the suction hole 124. The positioning post 123 and the suction hole 124 cooperate to adhere the piece of packing foam 300 to the adhering surface 210 of the workpiece 200.

In at least one embodiment, a quantity of the positioning post 123 is two, and a quantity of the suction hole 124 is four. The positioning posts 123 and the suction holes 124 are arranged in a line on the matching surface 122.

In at least one embodiment, the fixing seat 2 includes a base 21 and a holding jig 22 (shown in FIG. 2). The base 21 and the holding jig 22 are coupled together. The base 21 and the holding jig 22 cooperatively define a receiving groove 23. The receiving groove 23 is used for receiving the workpiece 200. In at least one embodiment, a size of the receiving groove 23 corresponds to a size of the workpiece 200. In detail, the holding jig 22 includes a connecting plate 221 and two holding plates 222. The connecting plate 221 is perpendicularly coupled to the base 21. The two holding plates 222 extend perpendicularly from opposite ends of the connecting plate 221. An end of each holding plate 222 away from the connecting plate 221 defines a slot 223. When the workpiece 200 is received in the receiving groove 23, the workpiece 200 fixed in the slots 223. In at least one embodiment, the workpiece 200 includes two fasteners 220. When the workpiece 200 is received in the receiving groove 23, each fastener 220 of the workpiece 200 is received in a corresponding one of the slots 223 to fix the workpiece 200 in the receiving groove 23.

In at least one embodiment, the adhering surface 210 of the workpiece 200 defines at least one second through hole 230. When the suction tube 1 suctions the piece of packing foam 300 and places the piece of packing foam 300 on the adhering surface 210 of the workpiece 200, the positioning posts 123 are passed through the second through holes 230 of the workpiece 200 to ensure accurate positioning of the piece of packing foam 300 on the adhering surface 210.

In at least one embodiment, the base 21 of the fixing seat 2 defines at least one third through hole 211. When the workpiece 200 is received in the receiving groove 23, the second through holes 230 of the workpiece 200 are aligned with the third through holes 211 of the base 21. The third through holes 211 are used for receiving the positioning posts 123 therein when the positioning posts 123 are passed through the second through holes 230 of the workpiece 200 in order to realize accurate positioning of the piece of packing foam 300 on the adhering surface 210.

In operation of the packing foam positioning device 100, first, the workpiece 200 is fixed in the receiving groove 23 of the fixing seat 2 by fixing the workpiece 200 in the slots 223 of the holding plates 222. Then, the positioning posts 123 of the suction tube 1 are passed through the piece of packing foam 300, and the piece of packing foam 300 is adhered to the suction holes 124. Then, the suction tube 1 places the piece of packing foam 300 on the adhering surface 210 of the workpiece 200, and the positioning posts 123 are passed through the second through holes 230 of the workpiece 200 to ensure accurate positioning of the piece of packing foam 300 on the adhering surface 210. Finally, the suction tube 1 is pressed against the piece of packing foam 300 to adhere the piece of packing foam 300 to the adhering surface 210.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A packing foam positioning jig for assembling a piece of packing foam to a workpiece, the packing foam positioning jig comprising:
    a suction tube comprising a rod body and a positioning seat;
    wherein the rod body is coupled to the positioning seat; the rod body defines a suction channel; the positioning seat defines at least one suction hole; the at least one suction hole communicates with the suction channel; the positioning seat comprises at least one positioning post protruded from an outer surface of the positioning seat; the at least one positioning post is configured to sleeve connect with the piece of packing foam; the at least one suction hole is configured to suction the piece of packing foam; the at least one positioning post and the at least one suction hole cooperate to assemble the piece of packing foam to the workpiece; wherein the positioning seat comprises a matching surface protruded from the outer surface; a shape and size of the matching surface corresponds to a shape and size of the piece of packing foam; the at least one positioning post is arranged on the matching surface; the at least one suction hole is defined through the matching surface.

2. The packing foam positioning jig of claim 1, wherein a quantity of the positioning posts is two; a quantity of the suction holes is four; the positioning posts and the suction holes are arranged in a line on the matching surface.

3. The packing foam positioning jig of claim 1, further comprising a fixing seat separated from the suction tube; wherein the fixing seat defines a receiving groove for receiving the workpiece therein.

4. The packing foam positioning jig of claim 3, wherein the fixing seat comprises a base and a holding jig; the base is coupled to the holding jig; the receiving groove is cooperatively defined by the base and the holding jig.

5. The packing foam positioning jig of claim 4, wherein the holding jig comprises a connecting plate and two holding plates; the connecting plate is perpendicularly coupled to the base; the two holding plates perpendicularly extend from opposite ends of the connecting plate.

6. The packing foam positioning jig of claim 5, wherein an end of each holding plate away from the connecting plate defines a slot; the workpiece is fixed in the slots.

7. The packing foam positioning jig of claim 5, wherein the base defines at least one receiving hole for receiving the at least one positioning post.

8. The packing foam positioning jig of claim 4, wherein a size of the receiving groove corresponds to a size of the workpiece.

9. The packing foam positioning jig of claim 1, further comprising a fixing seat separated from the suction tube; wherein the fixing seat defines a receiving groove for receiving the workpiece therein.

* * * * *